(12) United States Patent
Tatarinov

(10) Patent No.: US 10,533,589 B2
(45) Date of Patent: Jan. 14, 2020

(54) TOLERANCE-COMPENSATING ELEMENT FOR COMPENSATING FOR A DISTANCE BETWEEN A DASHBOARD SUPPORT AND A BODY COMPONENT OF A VEHICLE

(71) Applicant: Benteler Automobiltechnik GmbH, Paderborn (DE)

(72) Inventor: Konstantin Tatarinov, Bielefeld (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 170 days.

(21) Appl. No.: 15/713,868

(22) Filed: Sep. 25, 2017

(65) Prior Publication Data

US 2018/0087550 A1    Mar. 29, 2018

(30) Foreign Application Priority Data

Sep. 26, 2016  (DE) ........................ 10 2016 118 138

(51) Int. Cl.
*F16B 5/02* (2006.01)
*B62D 27/02* (2006.01)

(52) U.S. Cl.
CPC .............. *F16B 5/025* (2013.01); *B62D 27/02* (2013.01)

(58) Field of Classification Search
CPC ...... F16B 5/1233; F16B 5/025; B62D 25/145; B62D 25/147
USPC ....................................................... 411/546
See application file for complete search history.

(56) References Cited

U.S. PATENT DOCUMENTS

| | | | | |
|---|---|---|---|---|
| 3,486,158 A | * | 12/1969 | Soltysik | F16B 5/0233 411/44 |
| 4,437,784 A | * | 3/1984 | Peterson | E04F 13/0853 29/432.2 |
| 4,883,382 A | * | 11/1989 | Mushya | F16B 5/0233 411/182 |
| 4,948,317 A | * | 8/1990 | Marinaro | F16B 43/00 220/3.7 |
| 5,178,501 A | * | 1/1993 | Carstairs | B62D 25/163 24/297 |

(Continued)

FOREIGN PATENT DOCUMENTS

| CN | 101033767 A | 9/2007 |
|---|---|---|
| CN | 102138011 B | 7/2011 |

(Continued)

*Primary Examiner* — Flemming Saether
(74) *Attorney, Agent, or Firm* — Holland & Hart LLP

(57) ABSTRACT

The disclosure relates to a tolerance-compensating element for compensating for a distance between a dashboard support and a body component of a vehicle, such as an A pillar or an end wall, wherein the dashboard support is connectable to the body component by means of a fastening screw, comprising: a frame structure with a first fastening portion and a second fastening portion, wherein the first fastening portion and the second fastening portion are arranged opposite each other and are connected by lateral webs, wherein the first fastening portion and the second fastening portion are spaced apart from each other, wherein a first aperture is formed in the first fastening portion, wherein the second fastening portion is configured for fastening the tolerance-compensating element to the dashboard support; and a threaded nut that is assigned to the first fastening portion and is provided for receiving the fastening screw.

19 Claims, 11 Drawing Sheets

(56) References Cited

U.S. PATENT DOCUMENTS

| | | | | |
|---|---|---|---|---|
| 5,492,388 A * | 2/1996 | Kawasaki | ............ | B62D 25/147 296/193.02 |
| 5,906,346 A * | 5/1999 | Lin | ........................ | F16B 5/02 248/224.8 |
| 7,896,596 B2 * | 3/2011 | Rausch | ................ | F16B 37/041 411/174 |
| 8,302,918 B2 * | 11/2012 | Watanabe | ............ | B62D 25/147 248/201 |
| 9,381,883 B2 * | 7/2016 | Morita | ................ | B62D 25/145 |
| 9,611,652 B2 * | 4/2017 | Haddock | ............ | E04F 13/0842 |

FOREIGN PATENT DOCUMENTS

| | | |
|---|---|---|
| CN | 103649564 A | 3/2014 |
| CN | 105416438 A | 3/2016 |

\* cited by examiner

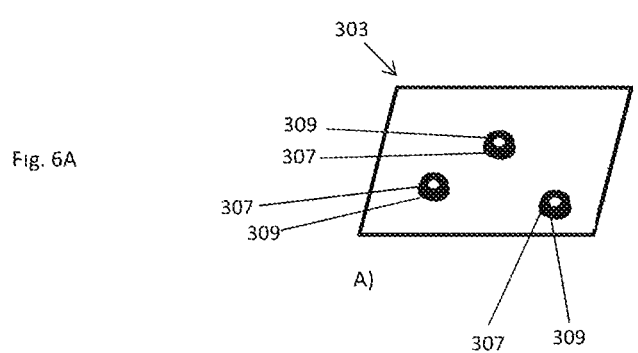
Fig. 6A
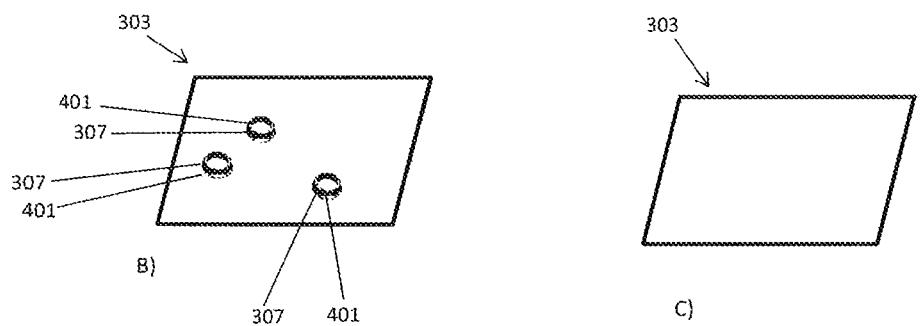
Fig. 6B
Fig. 6C

TOLERANCE-COMPENSATING ELEMENT FOR COMPENSATING FOR A DISTANCE BETWEEN A DASHBOARD SUPPORT AND A BODY COMPONENT OF A VEHICLE

CROSS-REFERENCE TO RELATED APPLICATIONS

This application claims priority to German patent application No. 10 2016 118 138.2, entitled "Toleranzausgleichselement zum Ausgleichen eines Abstandes zwischen einem Instrumententräger and einem Karosseriebauteil eines Fahrzeugs", and filed on Sep. 26, 2016 by the assignee of this application, the entire disclosure of which is incorporated by reference for all purposes.

BACKGROUND

The present disclosure relates to the holding of a dashboard support on a body component of a vehicle.

In order to hold one or more attachments, such as, for example, a steering wheel, in a motor vehicle, use is made of a dashboard support which is arranged between the A pillars of the motor vehicle by means of at least one cross member.

Due to manufacturing tolerances, the distances between the A pillars can fluctuate, which can lead to a distance between an end-side end of the cross member and A pillar. In order to bridge such a distance, the device described in document EP 0 768 468 A1 for connecting components arranged at a distance from one another can be efficiently used.

It is the object of the present disclosure to create an alternative concept for compensating for a distance between the dashboard support and an A pillar of a vehicle.

SUMMARY

This object is achieved by the features of the independent claims. Advantageous developments are the subject matter of the dependent claims, the description and the attached figures.

According to one aspect, the disclosure relates to a tolerance-compensating element for compensating for a distance between a dashboard support and a body component of a vehicle, in particular an A pillar or an end wall, wherein the dashboard support is connectable to the body component by means of a fastening screw, comprising a frame structure with a first fastening portion and a second fastening portion, wherein the first fastening portion and the second fastening portion are arranged opposite each other and are connected by lateral webs, wherein the first fastening portion and the second fastening portion are spaced apart from each other, wherein a first aperture is formed in the first fastening portion, wherein the second fastening portion is configured for fastening the tolerance-compensating element to the dashboard support; and a threaded nut which is assigned to the first fastening portion and is provided for receiving the fastening screw, in particular an external thread of the fastening screw.

The frame structure permits simple, efficient compensation for different distances which can occur because of manufacturing tolerances.

Within the scope of the disclosure, the threaded nut should also be understood as meaning a threaded plate or a flange nut with a stop flange.

In one example, the tolerance-compensating element or the frame structure is formed from plastic, in particular from a fibre-reinforced plastic.

In one example, the frame structure has a rigidity upon pressing of the threaded nut against the dashboard support in the axial direction of between 0.1 N/mm and 100 N/mm.

In one example, the frame structure is of resilient design. An efficient compensation for gaps can be brought about by means of a spring deflection of the frame structure.

In one example, a second aperture is formed in the second fastening portion, and wherein the first aperture and the second aperture are in particular oriented so as to be aligned with each other and are penetrable by the fastening screw.

In one example, the second fastening portion can connect the lateral webs. In this connection, the second aperture can be formed in the second fastening portion.

In one example, the second fastening portion can be open between the lateral webs, i.e. cannot connect the lateral webs. In this case, the second aperture is formed by a space or a distance between the lateral webs.

In one example, the fastening portions each have a round base region, in which the respective aperture is formed. In particular, tolerances of a few millimetres can be bridged.

In one example, the frame structure is plastically deformable or is elastic. As a result, the frame structure can be adapted to the distance to be bridged, for example of a few millimetres, by tightening of the fastening screw.

In one example, the threaded nut forms a portion of the first fastening portion, wherein the first aperture is formed by the threaded opening of the threaded nut, or wherein the threaded nut is arranged at the first fastening portion, wherein a threaded opening of the threaded nut is oriented so as to be aligned with the first aperture, or wherein the threaded nut penetrates the first aperture. The threaded nut can be formed integrally with the frame structure or designed as a separate element.

In one example, the threaded nut protrudes outwards in the direction of the body component and is in particular pressable onto the body component. As a result, force can be exerted via the threaded nut on the frame structure in order to deform the latter.

In one example, the threaded nut partially projects into an intermediate space between the first fastening portion and the second fastening portion. This makes it possible to limit a deformation stroke during deformation of the frame structure.

In one example, the threaded nut is mounted so as to be displaceable laterally, in particular transversely, with respect to the screwing direction. As a result, in addition to a vertical compensation for tolerances in the direction of extent of the distance, a lateral or horizontal compensation for tolerances transversely with respect to a direction of extent of the distance is also made efficiently possible in order, for example, to orient the apertures with one another. The second aperture can be correspondingly dimensioned.

In one example, the threaded nut is mounted in the frame structure so as to be displaceable, in particular so as to be laterally loosely displaceable, and preferably so as to be secure against rotation. Efficient adjustment of the arrangement of the threaded nut can thereby be achieved. Securing against rotation can be achieved by means of a form-fitting connection to the frame structure.

In one example, the threaded nut is mounted rigidly in respect of displacement in the direction of the second fastening portion and/or in the screwing direction.

In one example, the lateral webs are arched outwards or shaped in the manner of a bow, and in particular they each have a bend. As a result, during the compression of the frame structure, the lateral webs can yield outwards, which permits a defined deformation.

In one example, the lateral webs are each compressible or shiftable, in particular with respect to each other, to compensate for tolerances. This makes it possible not only to produce efficient compensation for tolerances, but also a spring action.

In one example, the lateral webs are plastically deformable or are elastic. Efficient compensation for tolerances can thereby be brought about.

In one example, the lateral webs are profile webs. The profile webs can be extruded from plastic, glass fibre-reinforced plastic or aluminium, in particular transversely with respect to a screwing direction of the fastening screw. Furthermore, the lateral webs can each have at least one or more longitudinal ribs. The strength of the webs in the deformed state can thereby be increased. Thinner flexible portions can also be produced in the profile webs, which can improve the elastic properties of the latter.

In one example, the second aperture is thread-free. As a result, the fastening screw can be pushed through the second aperture.

In one example, the frame structure is laterally open. This makes it possible to ensure a vertical deformability of the frame structure, in which the fastening portions are shiftable relative to one another.

In one example, the second fastening portion has at least one holding clip which points outwards, in particular in the direction of the dashboard support, in particular a Christmas tree clip, for fastening the tolerance-compensating element to the dashboard support. The holding clip can be fastened in particular to an end-side holder or to a holding clamp of the dashboard support. As a result, during the mounting, the tolerance-compensating element can be positioned precisely with respect to the dashboard support and held on the latter.

According to a second aspect, the disclosure therefore relates to a dashboard support with a holding element in which at least one holding opening is formed for receiving a holding clip of the tolerance-compensating element according to the first aspect. The holding element can be configured as a separate part joined to the dashboard support, or can be formed integrally on and of the same material as the dashboard support.

According to a third aspect, the disclosure relates to a connecting arrangement, comprising: the tolerance-compensating element according to the first aspect; and a dashboard support which laterally has a holding element for fastening the dashboard support to a body component of a vehicle, in particular to an A pillar, wherein the holding element has a holding aperture; wherein the second fastening portion lies against the holding element in such a manner that the holding aperture is oriented so as to be aligned with the second aperture and is penetrable by a fastening screw.

In one example, a holding opening for receiving a holding clip of the tolerance-compensating element according to the first aspect is additionally formed in the holding element.

In one example, the holding aperture comprises an internal thread for receiving an external thread of the fastening screw, or the internal thread of the holding aperture is producible by an external thread of the fastening screw, by the external thread of the fastening screw being screwed in, or the holding aperture is producible by the fastening screw being screwed into the holding element.

In one example, the holding element has a further threaded nut which is arranged in alignment with, and preferably secure against rotation on, the holding aperture and which is configured to receive an external thread of the fastening screw.

BRIEF DESCRIPTION OF THE DRAWINGS

Examples of the principles of this disclosure are explained in more detail with reference to the appended drawings.

FIGS. 6A through 6C show an example holder;

DETAILED DESCRIPTION OF THE DRAWINGS

Figure 1A:
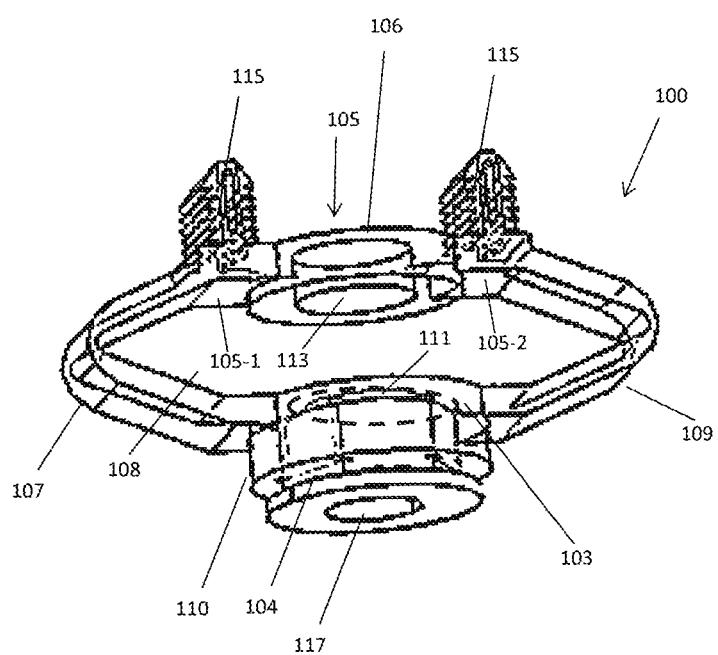
FIG. 1A shows an example of a tolerance-compensating element.

FIG. 1A shows a tolerance-compensating element 100 for compensating for a manufacturing-tolerance-induced distance between a dashboard support and a body component, in particular an A pillar or an end wall, of a vehicle, wherein the dashboard support is connectable to the body component by means of a fastening screw (not illustrated).

The tolerance-compensating element 100 has a frame structure 101 with a first fastening portion 103 and a second fastening portion 105, wherein the first fastening portion 103 and the second fastening portion 105 are arranged opposite each other and are connected by lateral webs 107, 109.

A first aperture 111 is formed in the first fastening portion 103, in particular in a base region 110 of the first fastening portion.

In the example illustrated in FIG. 1, the second fastening portion 105 has lateral holding webs 105-1, 105-2. The lateral webs 107 and 109 merge into the holding webs 105-1 and 105-2. The holding webs 105-1 and 105-2 extend substantially parallel to the first fastening portion 103.

A base region 106 in which a second aperture 113 is formed is arranged between the lateral holding webs 105-1 and 105-2. The base region 106 and the lateral holding webs 105-1 and 105-2 can be formed integrally.

The first aperture 111 and the second aperture 113 are oriented so as to be aligned with each other and are penetrable by the fastening screw, wherein the first fastening portion 103 is connectable to the body component, and wherein the second fastening portion 105 is connectable to the dashboard support, and a threaded nut 104 which is assigned to the first fastening portion 103 and is provided for receiving the fastening screw, in particular an external thread of the fastening screw.

The first fastening portion 103 and the second fastening portion 105 are spaced apart from each other and define an intermediate space 108. The intermediate space 108 defines a deformation region of the tolerance-compensating element 100 because of the deformation, for example compression, of the frame structure 101 for the compensation for tolerances, in particular during the mounting of the dashboard support.

The threaded nut 104 is secure against rotation and is arranged on the first fastening portion rigidly in respect of displacement axially in the direction of the second fastening portion 105. For this purpose, the threaded nut 104 can be held in a manner secure against rotation and by means of a form-fitting connection. For the form-fitting connection, the first fastening portion 103 can have a nut enclosure, into which the threaded nut is introducible from the outside. The nut enclosure can have an internal cross section which corresponds to an external cross section of the threaded nut.

The webs 107, 109 are arched outwards and are preferably deformable, as a result of which the fastening portions 103, 105 can be shifted relative to each other. For this purpose, the webs 107, 109 are, for example, bent over in a buckling manner.

The second fastening portion 105 furthermore has holding clips 115 which point outwards, in particular Christmas tree clips, for fastening the tolerance-compensating element 100 to the dashboard support. The holding clips 115 are fastened to the holding webs 105-1, 105-2. For this purpose, the holding clips 115 are inserted into corresponding apertures and are held there, for example, in a form-fitting or force-fitting manner.

Figure 1B:
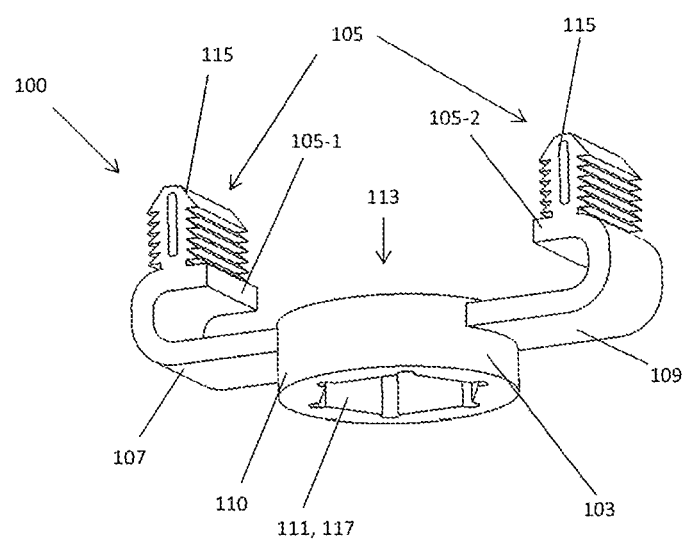
FIG. 1B shows an example of the tolerance-compensating element.

FIG. 1B shows an example of the tolerance-compensating element 100 without the base region 106. As a result, the frame structure 101 is U-shaped. The tolerance-compensating element 100 is fastened by means of the second fastening portion 105, wherein the holding webs 105-1, 105-2 are pressable against the dashboard support or a holder of the dashboard support. The second aperture 113 is formed by the distance between the holding webs 105-1, 105-2.

In the example illustrated in FIG. 1B, the first aperture 111 has a shape which is provided for receiving the threaded nut 104 in a form-fitting and rotationally fixed manner.

In an example which is illustrated by way of example in FIGS. 1A and 1B, the threaded nut 104 forms a portion of the first fastening portion, wherein the first aperture 111 is also formed by the threaded opening 117 of the threaded nut 104.

However, the threaded nut 104 can be arranged at or on the first fastening portion 103. The threaded nut 104 can, however, pass through the first aperture 111, as illustrated in FIG. 2.

Figure 2:
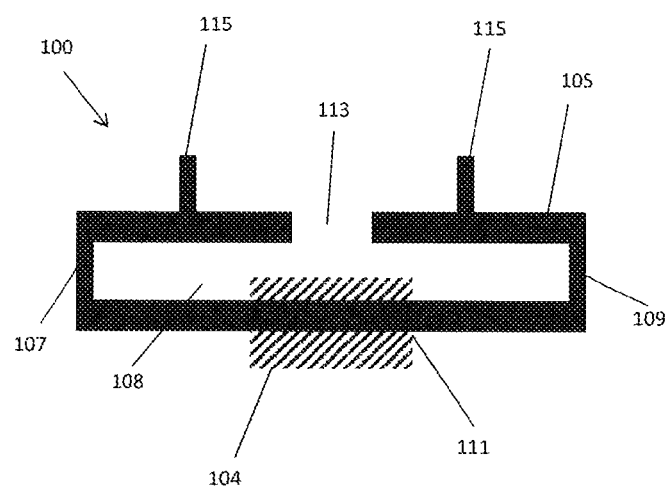
FIG. 2 shows an example of the tolerance-compensating element.

FIG. 2 schematically shows the tolerance-compensating element 100 in an example in which the threaded nut 104 penetrates the first aperture 111 and at least partially projects into the intermediate space 108.

In the example illustrated by way of example in FIG. 2, the lateral webs 107, 109 are guided rectilinearly and connect the fastening portions 103, 105. As a result, the frame structure 101 is rectangular. The compensation for tolerances can be brought about, for example, by at least one of the fastening portions 103, 105 deforming into the intermediate space 108.

Figures 3A, 3B:
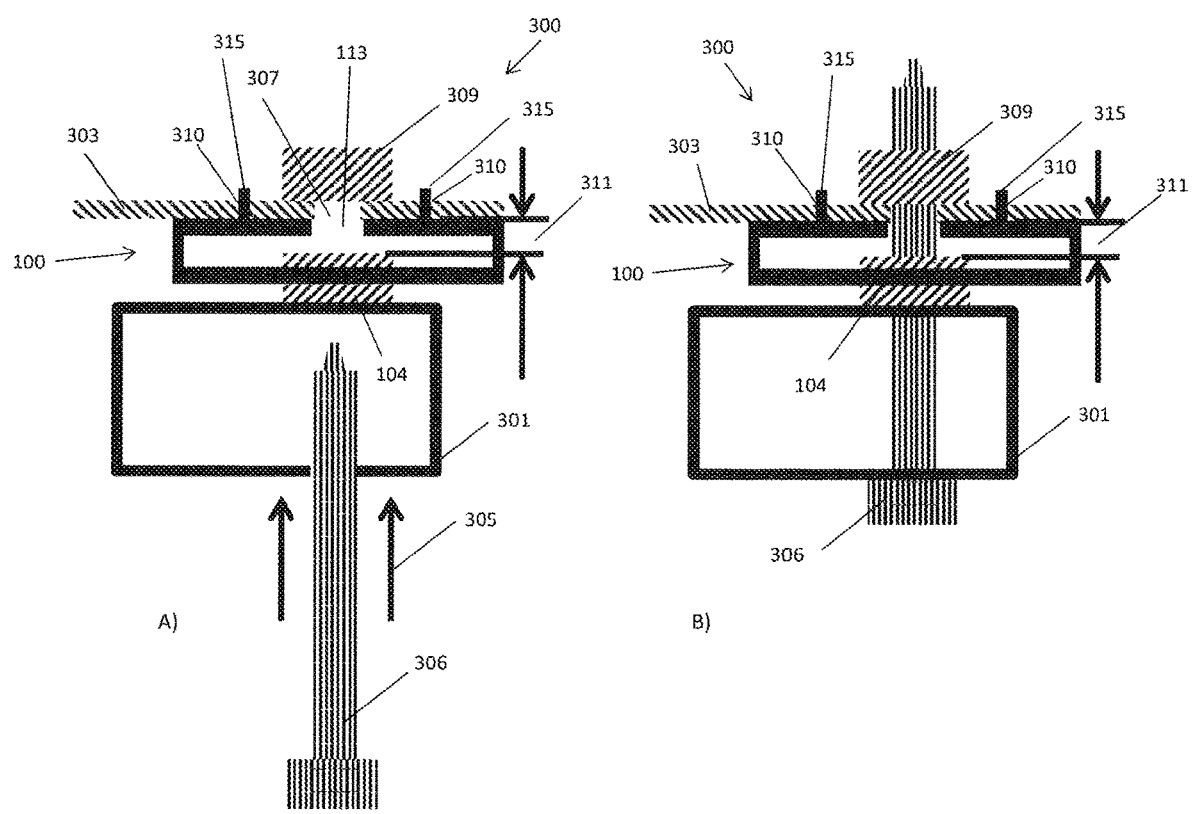
FIGS. 3A and 3B show an example of the connecting arrangement.

In FIGS. 3A and 3B, the connecting arrangement is illustrated in two mounting steps for connecting a body component 301, for example an A pillar, of a motor vehicle to a lateral holder 303 of a dashboard support. In this case, the fastening screw 306 penetrates the body component 301 in the direction of the depicted arrow 305 and is screwed into the threaded nut 104.

The holder 303 furthermore comprises further apertures 310 for receiving the holding clips 115. The tolerance-compensating element 100 can thereby be positioned in relation to the holder 303 or held on the holder 303.

The holder 303, for example a holding clamp, has a corresponding holding aperture 307 and, for example, a holding nut 309 which is arranged over the holding aperture and is connected to the holder 303, for example in an integrally bonded manner, by soldering, adhesive bonding or welding.

The fastening screw 306 is screwed further into the holding nut 309, and therefore a distance between the body component 305 and the dashboard support, and in particular the distance 311 between the threaded nut 104 and the holder 303, can be bridged.

The holding nut 309 can be connected to the holder 303 by means of an integrally bonded connection, for example a spot connection.

By contrast, the threaded nut 104 can be mounted in the frame structure 101 so as to be loose or displaceable and preferably secure against rotation.

The holders 300 can have a plurality of holding openings 307 which are provided for holding a plurality of tolerance-compensating elements 100.

Figures 4A, 4B:
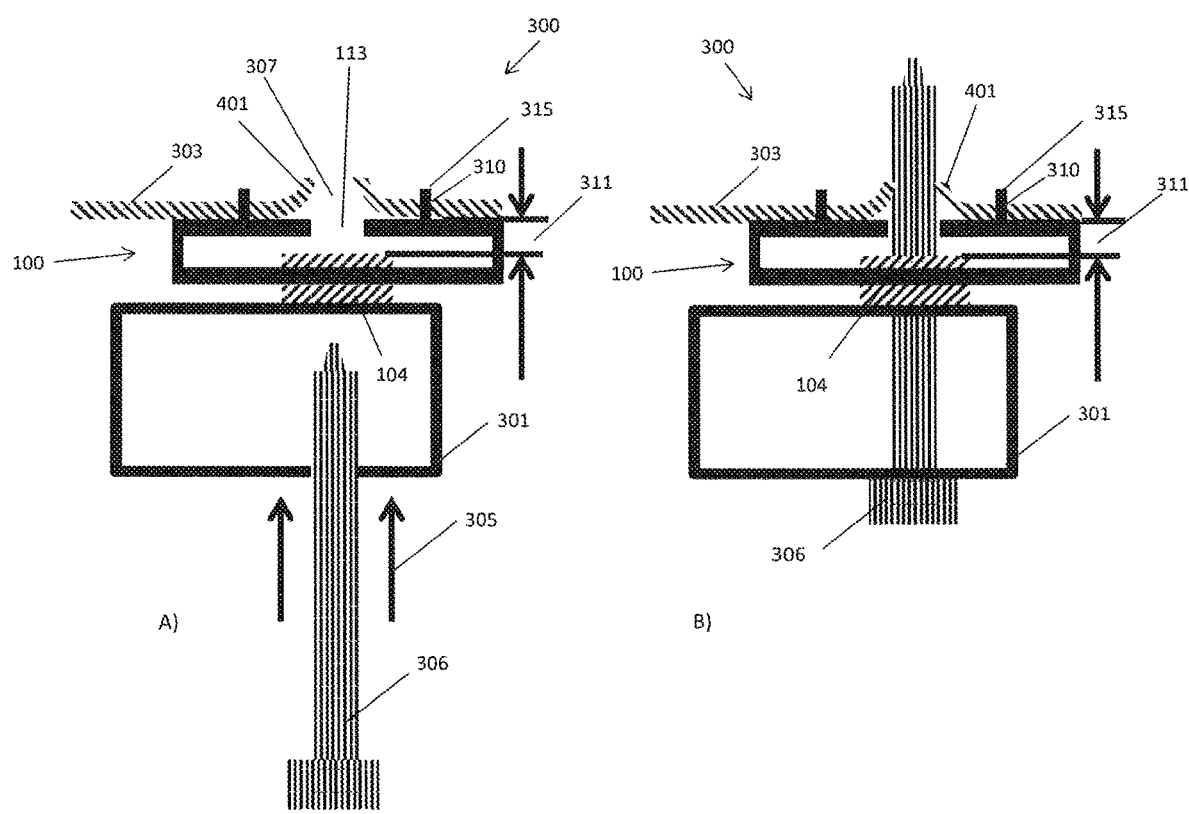
FIGS. 4A and 4B show an example of the connecting arrangement.

FIGS. 4A and 4B illustrate the connecting arrangement in two mounting steps for connecting a body component 301, for example an A pillar, of a vehicle to a lateral holder 303 of a dashboard support. In contrast to the connecting arrangement 300 illustrated in FIGS. 3A and 3B, the holding opening 307 is surrounded by a hole edge 401 which is formed in the shape of a collar, forms a rim hole and into which an internal thread is cut for receiving an external thread of the fastening screw 305. The further fastening nut 309 can thereby be dispensed with.

Figures 5A, 5B:
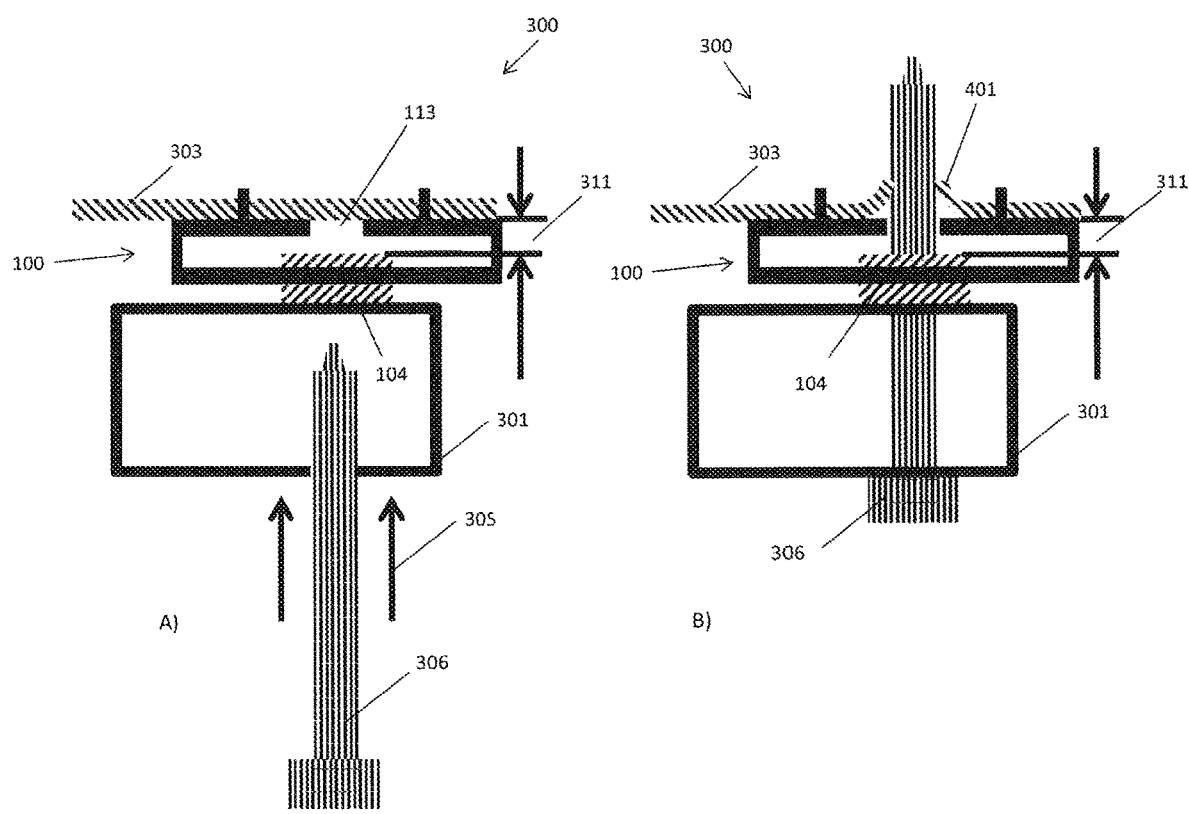
FIGS. 5A and 5B show an example of the connecting arrangement.

FIGS. 5A and 5B illustrate the connecting arrangement in two mounting steps for connecting a body component 301, for example an A pillar, of a vehicle to a lateral holder 303 of a dashboard support. In contrast to the examples illustrated in FIGS. 3A and 3B and FIGS. 4A and 4B, the holder 303 is initially formed without a coaxial holding opening 307. The holding opening 307 is instead perforated by the fastening screw 306 and provided with the internal thread.

FIGS. 6A to 6C illustrate corresponding holders 303. The holder 303 illustrated in FIG. 6A is illustrated in the example illustrated in FIGS. 3A and 3B. The holder 303 illustrated in FIG. 6B is illustrated in the example illustrated in FIGS. 4A and 4B. The holder 303 illustrated in FIG. 6C is illustrated in the example illustrated in FIGS. 5A and 5B.

Figure 7:
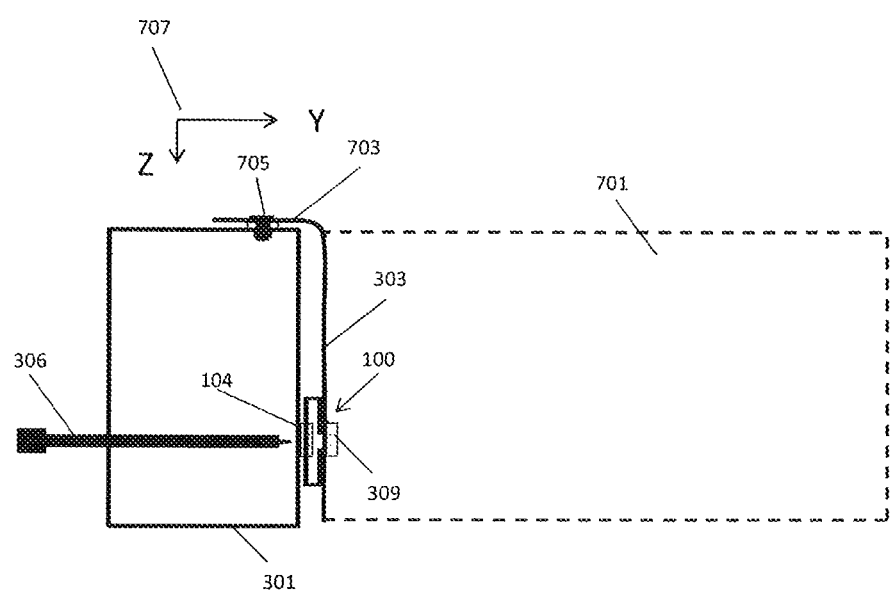
FIG. 7 shows an example of the connecting arrangement.

FIG. 7 illustrates a connecting arrangement with a schematically illustrated dashboard support 701. The holder 303 is bent laterally around the body component 301, for example around an A pillar, and has a bending portion 703 which is guided through a banjo screw 705 and fixed. In this case, a compensation for tolerances is possible both in the X and in the L direction in accordance with the system of coordinates 707 illustrated in FIG. 7. The threaded nut 309 lying against the body component 301 can be mounted loosely for this purpose.

Figure 8:
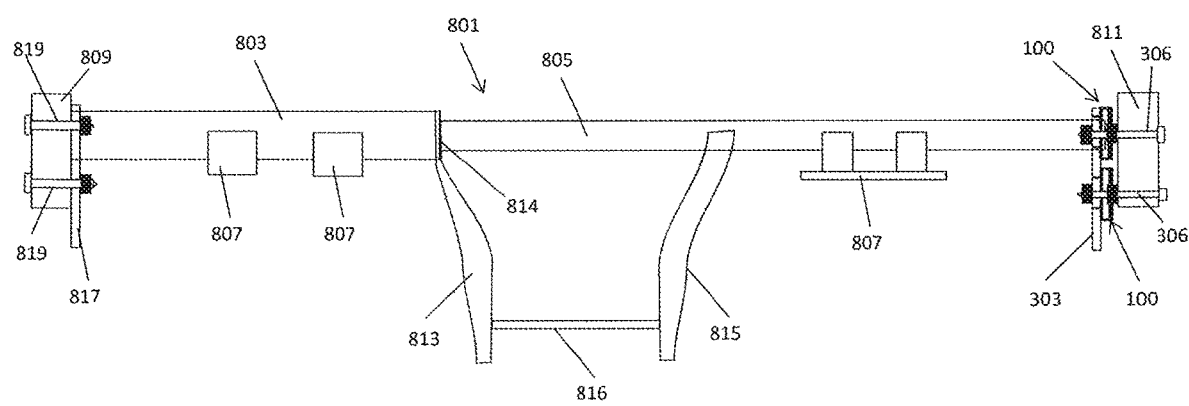
FIG. 8 shows an example of the dashboard support.

FIG. 8 shows a dashboard support 801 for holding an attachment (not illustrated in FIG. 8), for example a steering wheel or a component of a glove compartment, in a motor vehicle. The dashboard support 801 comprises a first tubular cross member 803 for the mounting of the attachment, and a second tubular cross member 805 which is connected to the cross member 803. However, the dashboard support 801 can also have just one cross member.

Exemplary holding parts 807, for example holding tabs, for fastening the attachments are attached to the first cross member 803 and to the second cross member 805.

The dashboard support 801 is inserted laterally between opposite body components 809, 811, for example A pillars, and is connected to the body components 809 and 811 by means of the lateral holders 303.

The dashboard support 801 optionally furthermore comprises two tunnel supports 813, 815 which are connected to each other by means of a strut 816. The tunnel support 813 is arranged at the connection point 814 between the cross members 803 and 805.

On the side facing the body component 809, the dashboard support 801 can be fastened by means of the holder 817, for example a holding clamp, without compensation for tolerances by one or more fastening screws 819 and tightened. As a result, a distance 821 can arise between the body component 811 and the dashboard support 801, said distance being able to be compensated for by means of at least one or more, for example two or three, tolerance-compensating elements 100.

However, in one example, tolerance-compensating elements 100 can be provided analogously on the body component 809.

Figure 9:
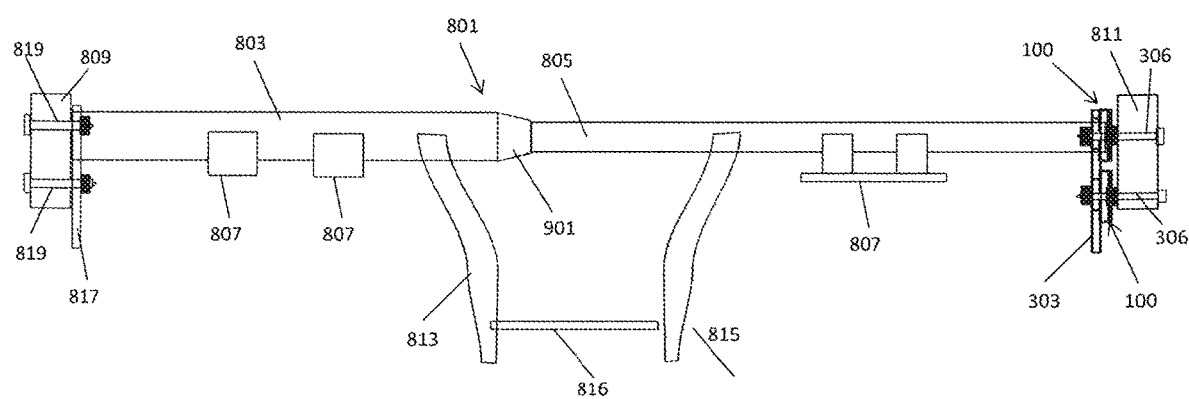
FIG. 9 shows an example of the dashboard support.

FIG. 9 shows an example of the dashboard support 801, in which, in contrast to the example according to FIG. 8, the tunnel support 813 is attached to the first cross member 803. The cross members 803 and 805 are connected by means of a conical connector 901 which compensates for the difference of the diameters between the cross members 803 and 805.

Figures 10A, 10B, 10C:
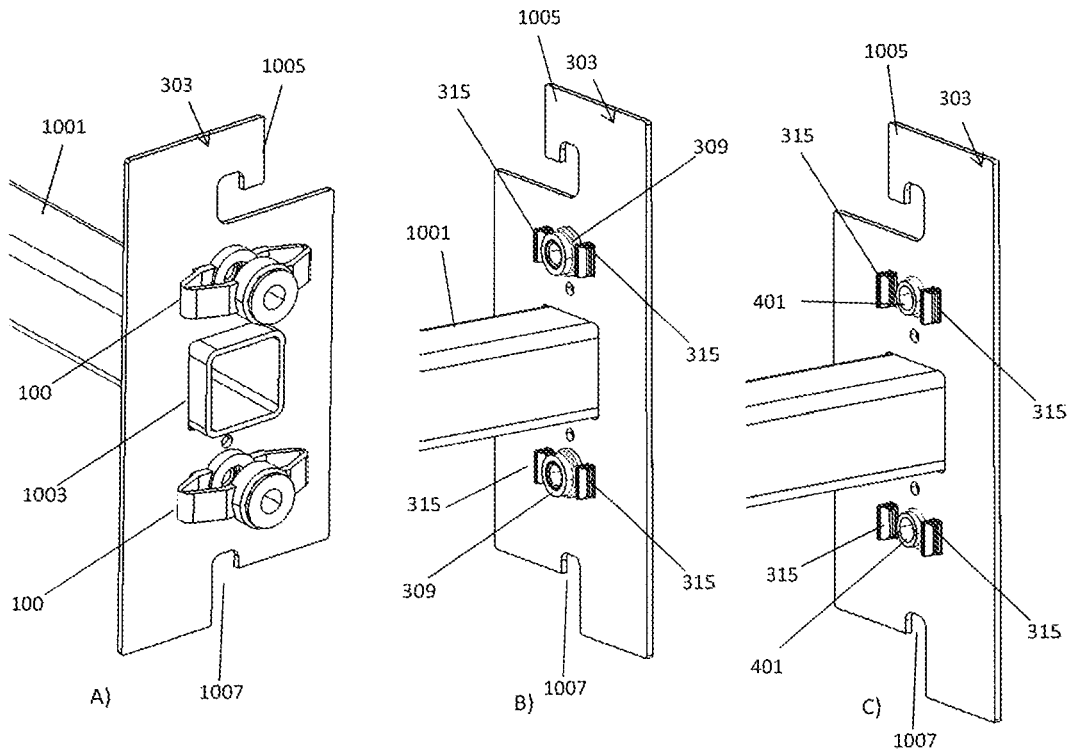
FIGS. 10A through 10C show a holder of a dashboard support.

FIGS. 10A, 10B and 10C show the holder of an exemplary dashboard support 1001 by means of the holder 303 according to the examples illustrated in FIGS. 6A and 6B. The holder 303 can have a central aperture 1003, through which the dashboard support 1001 penetrates. The holders 303 can each be arranged one above another. The holder 303 can furthermore have hook portions 1007 and oppositely arranged positioning notches 1009.

What is claimed is:

1. A tolerance-compensating element for compensating for a distance between a dashboard support and a body component of a vehicle, wherein the dashboard support is configured to connect to the body component with a fastening screw, comprising:
    a frame structure with a first fastening portion and a second fastening portion, wherein the first fastening portion and the second fastening portion are arranged opposite each other and are connected by lateral webs, wherein the first fastening portion and the second fastening portion are spaced apart from each other, wherein a first aperture is formed in the first fastening portion, wherein the second fastening portion is configured for fastening the tolerance-compensating element to the dashboard support, wherein a second aperture is formed in the second fastening portion, and wherein the first aperture and the second aperture are oriented to be aligned with each other and are penetrable by the fastening screw; and
    a threaded nut that is assigned to the first fastening portion and is provided for receiving an external thread of the fastening screw.

2. The tolerance-compensating element according to claim 1, wherein the body component of the vehicle is an A pillar or an end wall.

3. The tolerance-compensating element according to claim 1, wherein the threaded nut forms a portion of the first fastening portion, wherein the first aperture is formed by the threaded opening of the threaded nut, or wherein the threaded nut is arranged at the first fastening portion, wherein a threaded opening of the threaded nut is oriented to be aligned with the first aperture, or wherein the threaded nut penetrates the first aperture.

4. The tolerance-compensating element according to claim 1, wherein the threaded nut protrudes outwards in the direction of the body component and is pressable onto the body component.

5. The tolerance-compensating element according to claim 1, wherein the threaded nut partially projects into an intermediate space between the first fastening portion and the second fastening portion.

6. The tolerance-compensating element according to claim 1, wherein the threaded nut is mounted in the frame structure to be displaceable and fixed against rotation.

7. The tolerance-compensating element according to claim 1, wherein the lateral webs are arched outwards.

8. The tolerance-compensating element according to claim 7, wherein the lateral webs each have a bend.

9. The tolerance-compensating element according to claim 1, wherein the lateral webs are each compressible or shiftable with respect to each other to compensate for tolerances.

10. The tolerance-compensating element according to claim 1, wherein the lateral webs are plastically deformable or are elastic.

11. The tolerance-compensating element according to claim 1, wherein the lateral webs are profile webs.

12. The tolerance-compensating element according to claim 11, wherein the lateral webs are profile webs are extruded profile webs.

13. The tolerance-compensating element according to claim 1, wherein the second aperture is thread-free.

14. The tolerance-compensating element according to claim 1, wherein the second fastening portion comprises at least one holding clip that points outwards in the direction of the dashboard support.

15. The tolerance-compensating element according to claim 14, wherein the at least one holding clip that points outwards is a Christmas tree clip.

16. A tolerance-compensating element for compensating for a distance between a dashboard support and a body component of a vehicle, wherein the dashboard support is configured to connect to the body component with a fastening screw, comprising:
    a frame structure with a first fastening portion and a second fastening portion, wherein the first fastening portion and the second fastening portion are arranged opposite each other and are connected by lateral webs, wherein the first fastening portion and the second fastening portion are spaced apart from each other, wherein a first aperture is formed in the first fastening portion, wherein the second fastening portion is configured for fastening the tolerance-compensating element to the dashboard support; wherein the frame structure is laterally open; and
    a threaded nut that is assigned to the first fastening portion and is provided for receiving an external thread of the fastening screw.

17. A connecting arrangement, comprising:
    a tolerance-compensating element comprising:
        a frame structure with a first fastening portion and a second fastening portion, wherein the first fastening portion and the second fastening portion are arranged opposite each other and are connected by lateral webs, wherein the first fastening portion and the second fastening portion are spaced apart from each other, wherein a first aperture is formed in the first fastening portion, wherein the second fastening portion is configured for fastening the tolerance-compensating element to the dashboard support; and a threaded nut that is assigned to the first fastening portion and is provided for receiving an external thread of the fastening screw; and a dashboard support that laterally comprises a holding element for fastening the dashboard support to a body component of a vehicle, wherein the holding element comprises a holding opening; wherein the second fastening portion lies against the holding element in a manner that the holding opening is oriented to be aligned with the second aperture and is penetrable by a fastening screw.

18. The connecting arrangement according to claim 17, wherein the holding aperture comprises an internal thread for receiving an external thread of the fastening screw, or wherein an internal thread is produced in the holding aperture by an external thread of the fastening screw, by the external thread of the fastening screw being screwed in, or wherein the holding aperture is produced by screwing the fastening screw into the holding element.

19. The connecting arrangement according to claim 17, wherein the holding element comprises a further threaded nut arranged to be aligned with and secure against rotation with respect to the holding opening, and the further threaded nut is configured to receive an external thread of the fastening screw.

* * * * *